US010095615B2

(12) United States Patent
Basu et al.

(10) Patent No.: US 10,095,615 B2
(45) Date of Patent: Oct. 9, 2018

(54) GARBAGE COLLECTION BASED ON TOTAL RESOURCE USAGE AND MANAGED OBJECT METRICS

(71) Applicant: Microsoft Technology Licensing, LLC, Redmond, WA (US)

(72) Inventors: Abhinaba Basu, Redmond, WA (US); Jaiprakash Sharma, Hyderabad (IN); Srivatsan Kidambi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 15/189,842

(22) Filed: Jun. 22, 2016

(65) Prior Publication Data

US 2016/0299841 A1    Oct. 13, 2016

Related U.S. Application Data

(63) Continuation of application No. 13/161,574, filed on Jun. 16, 2011, now Pat. No. 9,384,129.

(51) Int. Cl.
*G06F 7/00* (2006.01)
*G06F 17/30* (2006.01)
*G06F 12/02* (2006.01)

(52) U.S. Cl.
CPC ...... *G06F 12/0253* (2013.01); *G06F 12/0269* (2013.01); *G06F 17/30138* (2013.01); *G06F 17/30303* (2013.01)

(58) Field of Classification Search
CPC ......... G06F 17/30138; G06F 17/30348; G06F 12/0871; G06F 12/0269; G06F 12/0253

USPC .......................................................... 711/171
See application file for complete search history.

(56) References Cited

U.S. PATENT DOCUMENTS

| 6,209,003 | B1 * | 3/2001 | Mattis ................... G06F 12/023 |
| 6,253,215 | B1 | 6/2001 | Agesen et al. |
| 6,308,185 | B1 | 10/2001 | Grarup et al. |
| 6,400,681 | B1 * | 6/2002 | Bertin ................... H04L 49/205 370/218 |
| 6,415,302 | B1 | 7/2002 | Garthwaite et al. |
| 6,424,977 | B1 | 7/2002 | Garthwaite |
| 6,434,577 | B1 | 8/2002 | Garthwaite |
| 6,463,249 | B2 * | 10/2002 | Mikita ............... G03G 15/2025 399/324 |
| 6,463,454 | B1 | 10/2002 | Lumelsky et al. |
| 6,598,141 | B1 | 7/2003 | Dussud et al. |
| 6,618,738 | B2 | 9/2003 | Ozawa et al. |
| 6,865,657 | B1 | 3/2005 | Traversat et al. |
| 6,934,249 | B1 | 8/2005 | Bertin et al. |
| 7,069,280 | B2 | 6/2006 | Garthwaite |
| 7,096,238 | B2 | 8/2006 | Garthwaite |
| 7,171,527 | B2 | 1/2007 | Pliss et al. |

(Continued)

OTHER PUBLICATIONS

"Advanced Garbage Collection Topics", Retrieved From «http://www.hesab.net/book/asp.net/Additional%20Documents/Advanced%20Garbage%20Collection%20Topics.pdf», Retrieved Date: Apr. 11, 2011, 3 Pages.

(Continued)

*Primary Examiner* — Daniel Kuddus

(57) ABSTRACT

A method includes selectively controlling, at a computing device having a memory, initiation of a full garbage collection operation based on a total resource usage metric and a managed object metric. The managed object metric is based on objects managed by a runtime application.

20 Claims, 8 Drawing Sheets

(56) References Cited

U.S. PATENT DOCUMENTS

| | | | | |
|---|---|---|---|---|
| 7,197,521 | B2* | 3/2007 | Subramoney | G06F 12/0269 |
| 7,581,075 | B1* | 8/2009 | Ciot | G06F 11/3419 |
| | | | | 711/170 |
| 7,624,395 | B2 | 11/2009 | Dostert | |
| 7,650,370 | B2 | 1/2010 | Dahlstedct | |
| 7,730,465 | B2* | 6/2010 | Sutter | G06F 8/315 |
| | | | | 717/116 |
| 7,779,054 | B1* | 8/2010 | Printezis | G06F 12/0276 |
| | | | | 707/813 |
| 7,934,035 | B2* | 4/2011 | Miloushev | G06F 9/5016 |
| | | | | 710/244 |
| 8,316,101 | B2 | 11/2012 | Ammerlaan et al. | |
| 2001/0023478 | A1 | 9/2001 | Ozawa et al. | |
| 2003/0196061 | A1 | 10/2003 | Kawahara et al. | |
| 2005/0259528 | A1 | 11/2005 | Fujita | |
| 2006/0085494 | A1 | 4/2006 | Dussud et al. | |
| 2006/0218557 | A1* | 9/2006 | Garthwaite | G06F 9/5016 |
| | | | | 718/105 |
| 2006/0259528 | A1 | 11/2006 | Dussud et al. | |
| 2008/0270482 | A1 | 10/2008 | Hillberg et al. | |
| 2009/0007211 | A1 | 1/2009 | Mathur et al. | |
| 2011/0054642 | A1 | 3/2011 | Bondar et al. | |
| 2012/0323979 | A1 | 12/2012 | Basu et al. | |

OTHER PUBLICATIONS

"Fundamentals of Garbage Collection", Retrieved From «https://msdn.microsoft.com/en-us/library/ee787088(v=vs.110).aspx», Apr. 11, 2011, 9 Pages.

"Understanding the MSXML Garbage Collection Mechanism", Retrieved From «https://support.microsoft.com/en-in/kb/304227», May 4, 2005, 3 Pages.

"Final Rejection Issued in U.S. Appl. No. 13/161,574", dated Mar. 25, 2015, 31 Pages.

"Final Rejection Issued in U.S. Appl. No. 13/161,574", dated Oct. 23, 2013, 27 Pages.

"Non Final Rejection Issued in U.S. Appl. No. 13/161,574", dated Sep. 17, 2014, 30 Pages.

"Non Final Rejection Issued in U.S. Appl. No. 13/161,574", dated Sep. 1, 2015, 28 Pages.

"Notice of Allowance Issued in U.S. Appl. No. 13/161,574", dated Mar. 1, 2016, 6 Pages.

"Non-Final Office Action Issued in U.S. Appl. No. 13/161,574", dated Apr. 3, 2013, 26 Pages.

Chung, Mendy, "Using JConsole to Monitor Applications", Dec. 2004, 13 Pages.

Ding, et al., "Gated Memory Control for Memory Monitoring, Leak Detection and Garbage Collection", Retrieved From «http://www.cs.rochester.edu/~cding/Documents/Publications/msp05.pdf», Jun. 12, 2005, 9 Pages.

Nilsen, Kelvin, "Issues in the Design and Implementation of Real-Time Java", Retrieved From «http://citeseerx.ist.psu.edu/viewdoc/download?doi=10.1.1.90.2401&rep=rep1&type=pdf», Jul. 19, 1996, 28 Pages.

Petrank, et al., "A Parallel, Incremental, Mostly Concurrent Garbage Collector for Servers", In ACM Transactions on Programming Languages and Systems, vol. 27, Issue 6, Nov. 2005, pp. 1097-1146.

Richter, Jeffrey, "Garbage Collection: Automatic Memory Management in the Microsoft .NET Framework", Retrieved From «http://msdn.microsoft.com/hi-in/magazine/bb985010(en-us).aspx», Nov. 2000, 10 Pages.

Siebert, Fridtjof, "Guranteering Non-Disruptiveness and Real-Time Deadlines in an incremental Garbage Collector", In Proceedings of the 1st international symposium on Memory management, Oct. 1, 1998, pp. 130-137.

Soman, Sunil, "Modern Garbage Collection for Virtual Machines", Retrieved From «http://citeseerx.ist.psu.edu/viewdoc/download?doi=10.1.1.91.9152&rep=rep1&type=pdf», Jan. 2003, 24 Pages.

* cited by examiner

GARBAGE COLLECTION BASED ON TOTAL RESOURCE USAGE AND MANAGED OBJECT METRICS

CROSS REFERENCE TO RELATED APPLICATIONS

The present application claims the benefit of U.S. patent application Ser. No. 13/161,574, filed on Jun. 16, 2011, which application is currently co-pending and is incorporated herein by reference.

BACKGROUND

Memory allocations in computer systems can typically be classified as either static allocations or dynamic allocations. Generally, the size and lifetime of statically allocated memory may be known before runtime (e.g., expressly defined in source code). Conversely, the size and lifetime of dynamically allocated objects in memory (e.g., in a "heap" portion of the memory) may vary during runtime. The process of monitoring dynamic memory operations may be referred to as memory management. Memory management may help prevent undesirable situations such as memory leaks in which memory space that is dynamically allocated by an application is not deallocated, thereby becoming "lost" to the application.

Garbage collectors are memory management tools that can deallocate dynamically allocated memory. When dynamically allocated objects in a managed heap are independent of objects outside the scope of the managed heap, garbage collectors may provide relatively stable and reliable memory management. However, dynamically allocated objects may include or refer to objects that are outside the scope of the managed heap (e.g., native objects), and vice versa. In this scenario, the garbage collector may not be able to deallocate managed objects from the managed heap until one or more associated native objects have been collected.

SUMMARY

One type of garbage collector is the generational garbage collector. Generational garbage collectors may operate on the premise that a majority of the dynamically allocated objects that are collectable during a garbage collection operation are those objects that have most recently been allocated. If a dynamically allocated object survives a garbage collection operation, it may be "promoted" to a higher (i.e., older) generation. For example, the objects in "generation 0" of a heap may be newer than objects stored in "generation 1" of the heap, and the objects stored in "generation 1" of the heap may be newer than the objects stored in "generation 2" of the heap. Based on the assumption that newly allocated (i.e., generation 0) objects will be more commonly collected than older (i.e., generation 1 and generation 2) objects, a generational garbage collector may perform two types of garbage collection operations: a full garbage collection and an ephemeral (e.g., partial) garbage collection. Whether a full garbage collection or ephemeral garbage collection is performed may depend on how much heap space is consumed by managed objects (i.e., objects that the garbage collector is aware of).

In a full garbage collection, the garbage collector may pause running applications and sweep all generations of the heap for "dead" objects (e.g., objects that are no longer needed by any running applications). In an ephemeral garbage collection, the garbage collector may sweep the newest generation (e.g., generation 0) for "dead" objects, sometimes without pausing running applications. Once an object (and any other objects included therein) is promoted out of generation 0, the object may no longer be collectable during an ephemeral garbage collection. Thus, it may be undesirable to have large objects residing in older generations of the heap, especially after the objects become collectable. The use of ephemeral garbage collection, when possible, may be preferable to the use of full garbage collection, as ephemeral garbage collection may avoid stopping or pausing executing applications.

In some computing systems, managed objects may include references (e.g., pointers) to larger native objects that the garbage collector is unaware of. Since the native object is referred to by the managed object, the native object may not be freed up until the managed object is collectable. In such situations, initializing garbage collection based solely on how much space is occupied by managed objects may not be effective. For example, a relatively small managed object may be promoted out of generation 0 even though the managed object has a reference to a much larger native object. Since full garbage collections may occur less frequently than ephemeral garbage collections, an effective size of the heap may be reduced due to the existence of large native objects in higher generations of the heap, which may lead to application crashes.

Systems and methods of garbage collection based on a total resource usage metric and a managed object metric are disclosed. For example, a memory manager may determine whether to initialize a full garbage collection operation or an ephemeral garbage collection operation based on managed object size as well as total heap usage. By considering multiple metrics, the memory manager may reduce how often managed objects having references to larger native objects are promoted out of generation 0, which may result in more available heap space and fewer application crashes.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
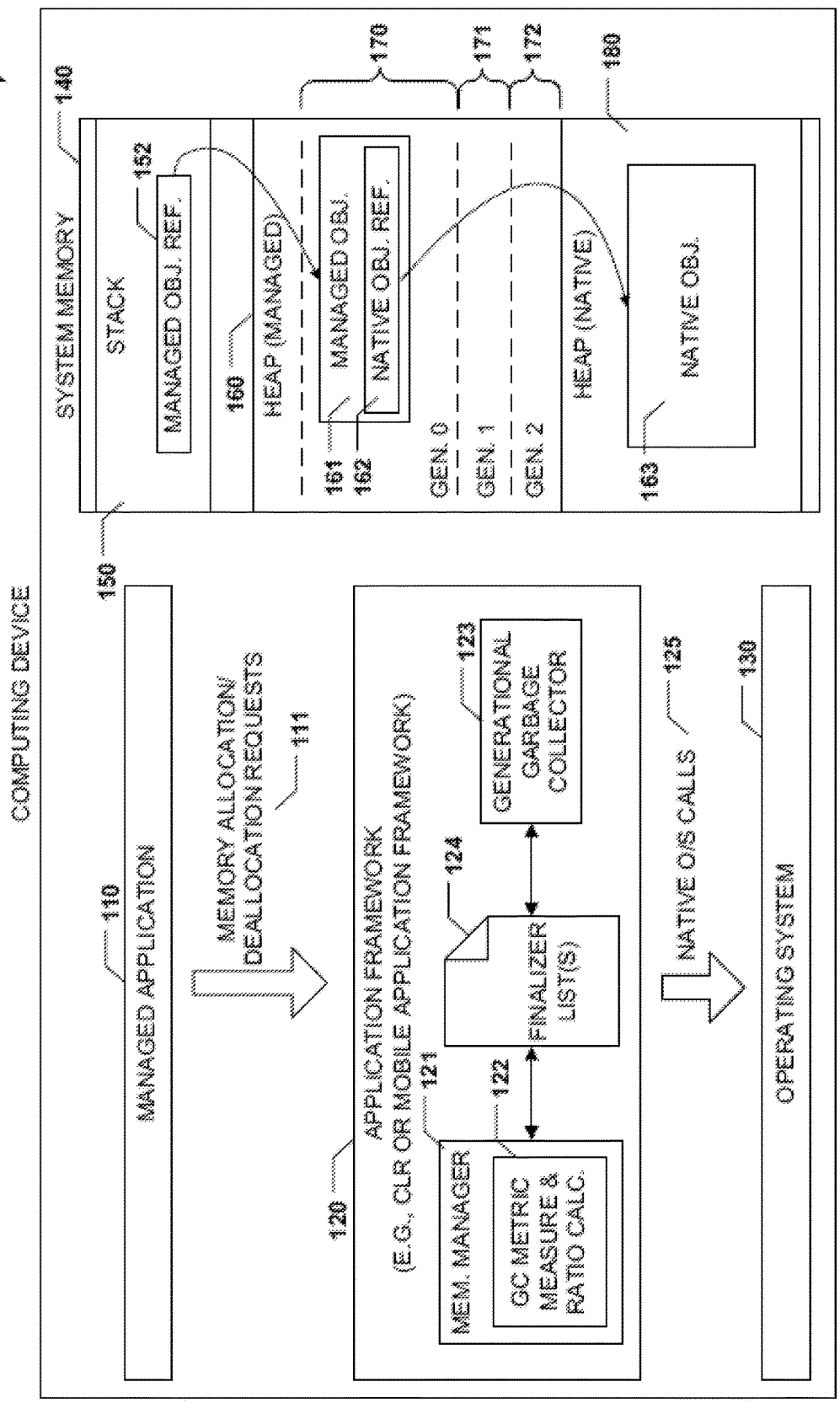
FIG. 1 is a block diagram to illustrate a particular embodiment of a computing device operable to perform garbage collection based on a total resource usage metric and a managed object metric.

The disclosed techniques may include determining whether to initiate a full garbage collection operation or an ephemeral garbage collection operation based on multiple metrics. For example a total resource usage metric and a managed object metric may be used in the determination. Using a combination of total memory (e.g., heap) usage and managed object usage may lead to more efficient memory management and fewer application crashes.

In a particular embodiment, a computer-implemented method includes selectively controlling, at a computing device having a memory, initiation of a full garbage collection operation based on a total resource usage metric and a managed object metric. The managed object metric is based on a number or size of objects managed by one or more runtime applications.

In another particular embodiment, a computer system includes a processor and a memory coupled to the processor. The memory stores a heap and a memory manager. The memory manager is executable by the processor to determine whether to initiate a full garbage collection operation or an ephemeral garbage collection operation on the heap based on a total resource usage metric and a managed object metric that is based on objects allocated in the heap and managed by one or more runtime applications. The memory also stores a generational garbage collector that is executable by the processor to perform the full garbage collection operation or the ephemeral garbage collection operation based on the determination.

In another particular embodiment, a computer-readable storage medium includes instructions that, when executed by a computer, cause the computer to determine whether a ratio of a total resource usage metric to a managed object metric is greater than a threshold, where the managed object metric is based on a number or size of objects managed by one or more runtime applications. The instructions, when executed by the computer, also cause the computer to initiate a full garbage collection operation when the ratio is greater than the threshold. The instructions, when executed by the computer, further cause the computer to determine whether the total resource usage metric is greater than a maximum total resource usage when the ratio is not greater than the threshold. The instructions, when executed by the computer, cause the computer to initiate the full garbage collection operation when the total resource usage metric is greater than the maximum total resource usage. The instructions, when executed by the computer, also cause the computer to, when the total resource usage metric is not greater than the maximum total resource usage, determine whether a size of a heap increased by a growth amount greater than a growth threshold. The instructions, when executed by the computer, further cause the computer to initiate the full garbage collection operation when the growth amount is greater than the growth threshold and to initiate an ephemeral garbage collection operation when the growth amount is less than the growth threshold.

Referring to FIG. 1, a particular embodiment of a computing device 100 is shown. The computing device 100 includes a system memory 140, an operating system 130, an application framework 120, and a representative managed application 110 (or multiple applications). The system memory 140 includes a stack 150 and a heap that is divided into a managed heap 160 and a native heap 180. The managed heap 160 may store multiple generations (e.g. generations 0, 1, and 2) of dynamically allocated data. The managed heap 160 includes a first portion 170 supporting generation 0, a second portion 171 supporting generation 1, and a third portion 172 supporting generation 2 data. The native heap 180 may store native objects. Managed objects stored in the managed heap 160 may include references to native objects stored in the native heap 180, and vice versa.

The application framework 120 includes a memory manager 121. The memory manager 121 includes logic 122 to perform garbage collection metric measurement and ratio calculations. The memory manager 121 may access a finalizer list 124 that is also accessible by generational garbage collector 123. The finalizer list 124 may represent a list of objects that have a finalizer method and are marked as "live" by the generational garbage collector 123. One or more finalizer threads (not shown) of the application framework 120 may execute the finalizers of objects in the finalizer list 124 so that the objects can be deallocated from the managed heap 160. Generally, the finalizer of an object may include clean-up operations that a programmer indicates are to be performed before the object is deallocated. For example, the finalizer of a managed object may include a call to a finalizer of native object that is stored in the native heap 180 and that is referenced by the managed object.

The application framework 120 receives memory allocation and deallocation requests 111 from one or more managed applications 110. The application framework 120 may generate native operating system calls 125 based on the requests 111, where the native operating system calls 125 are sent to the operating system 130. In a particular embodiment, the operating system 130 is a Windows®, Windows® Phone, or Windows® Mobile operating system that is available from Microsoft Corporation of Redmond, Wash., USA (Windows® is a registered trademark of Microsoft Corporation in the United States and other countries). In a particular illustrative embodiment, the application framework 120 may be a framework that supports a mobile application or another type of embedded environment supported by .NET, common language runtime (CLR), or similar technologies. For example, the application framework 120 may be a mobile application framework such as Silverlight®, available from Microsoft Corporation (Silverlight® is a registered trademark of Microsoft Corporation in the United States and/or other countries). It should be noted that such technologies are listed for example only. The garbage collection techniques disclosed herein may also be used with other operating system, application, and runtime technologies.

The system memory 140 includes the stack 150 which contains one or more managed object references. For example, an illustrative managed object reference 152 is stored within the stack 150. The managed object reference 152 may be created in the stack 150 by the managed application 110. The managed object reference 152 may correspond to a managed object 161 stored in the managed heap 160. Upon creation, the managed object 161 may be stored in generation 0 of the managed heap 160, as illustrated in FIG. 1. The managed object 161 may include a native object reference 162 to a native object 163 that is stored in the native heap 180. In a particular embodiment, the managed object 161 may be a dynamically allocated file handler, software handler, network connection, network socket, process resource (e.g., a mutex or a semaphore), or a user interface (UI) element, such as a Button, a GridControl, or another UI element.

During operation, the application framework 120 supports the memory manager 121 that may respond to the memory allocation or deallocation requests 111. In a particular embodiment, the memory manager 121, in response to receiving a memory allocation request or in response to another memory allocation trigger, determines whether to initiate a full garbage collection or an ephemeral garbage collection operation on the managed heap 160. The determination of whether to initiate a full garbage collection operation or an ephemeral garbage collection is based on a total resource usage metric and a managed object metric based on the objects allocated in the heap and managed by a runtime application. Alternatively, the managed object metric may be based on objects managed by all runtime applications being executed at the computing device 100. For example, the garbage collection metric measurement and ratio calculation logic 122 may measure garbage collection metrics and may calculate ratios that are used to determine whether to perform a full garbage collection operation on the heap or an ephemeral garbage collection operation on the managed heap 160, as further described with reference to FIGS. 2-7. The generational garbage collector 123 is responsive to commands from the memory manager 121 and may perform either the full garbage collection operation or the ephemeral garbage collection operation based on the determination made by the memory manager 121.

During operation, the managed application 110 may reach a point of execution when the managed object 161 on the managed heap 160 is no longer needed. In response, the managed application 110 may delete the managed object reference 152. However, if the managed object 161 has been promoted out of generation 0, an ephemeral garbage collection operation may not successfully deallocate the managed object 161 and its associated native object 163, as further illustrated in FIG. 2.

Figure 2:
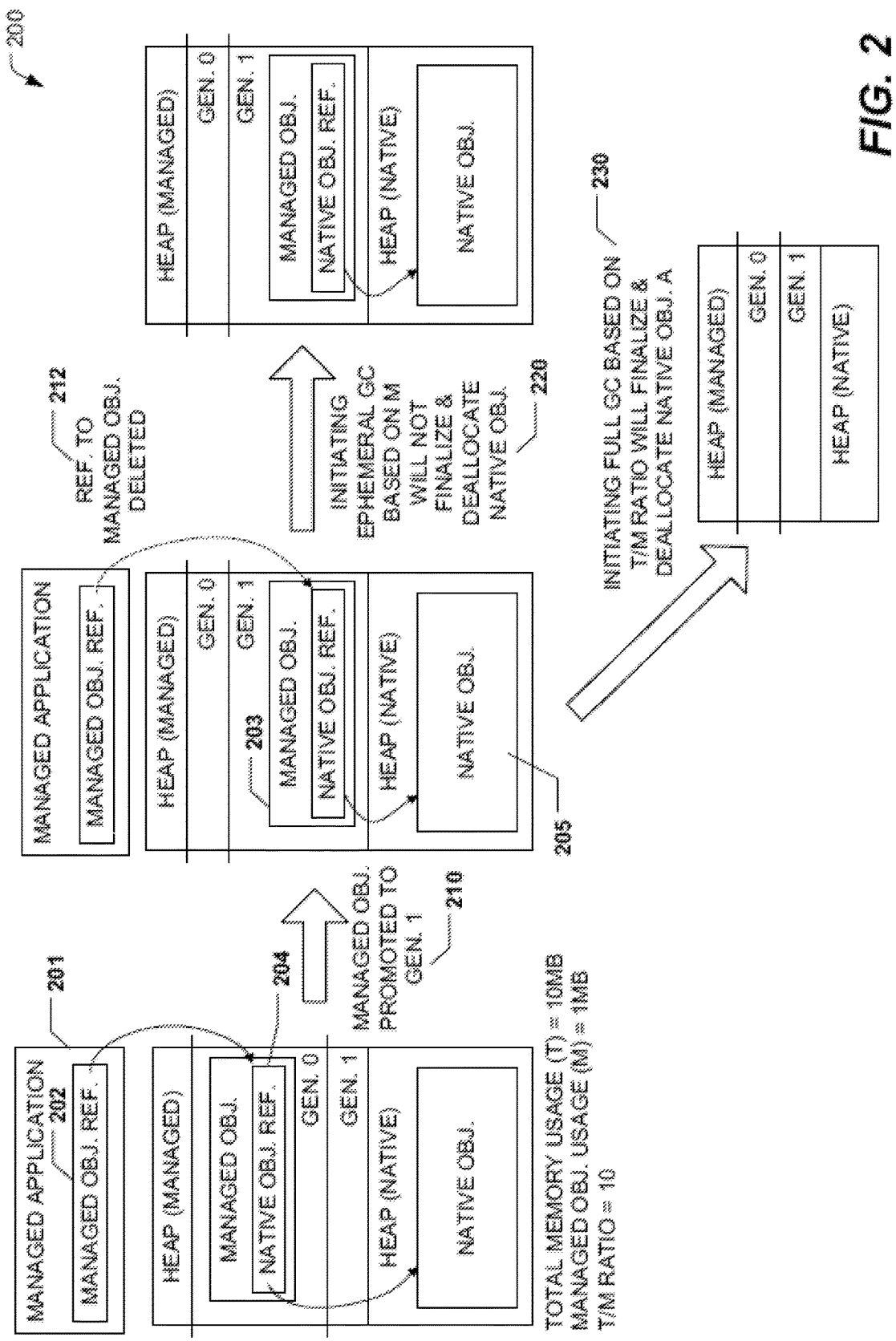
FIG. 2 is a block diagram to illustrate a particular embodiment of a method of performing garbage collection based on a total resource usage metric and a managed object metric.

Referring to FIG. 2, a particular embodiment of a method of performing garbage collection 200 is shown. A managed application 201 (e.g., the managed application 110 of FIG. 1) may own a managed object reference 202 (e.g., the managed object reference 152 of FIG. 1). The managed object reference 202 may refer to a managed object 203 (e.g., the managed object 161 of FIG. 1). The managed object 203 may include a native object reference 204 (e.g., the native object reference 162 of FIG. 1), which refers to a native object 205 (e.g., the native object 163 of FIG. 1). In the particular embodiment illustrated in FIG. 2, the managed object 203 may occupy one megabyte (1 MB) of heap space and the native object 205 may occupy 9 MB of heap space. Thus, a total memory usage (T) may be equal to 10 MB and a managed object usage (M) may be equal to 1 MB. In this illustrated example, a total memory usage/managed object usage (T/M) ratio may be equal to 10.

In response to a first ephemeral garbage collection operation, the objects within generation 0 are promoted to generation 1, as shown at 210. Subsequently, the managed application 201 may delete the managed object reference 202, as indicated at 212. Since the only reference to the managed object 203 has been deleted, the managed object 203 is "dead" and collectable (i.e., the memory corresponding to the object 203 and the associated native object 205 may be recovered by the garbage collector). However, since the managed object 203 is in generation 1, executing an ephemeral garbage collection based solely on the space occupied by managed objects (i.e., based on M=1 MB) would not finalize and deallocate the native object 205, as indicated at 220 (e.g., since a finalizer method of the native object 205 may not be executed until a finalizer method of the managed object 203 executes). As the size of generation 1 of the heap increases, the likelihood of an application crashing or an operating system terminating a running application due to lack of available memory also increases. Instead, determining to initiate a full garbage collection based on the T/M ratio=10 MB may successfully deallocate the objects 203 and 205. Accordingly, for the illustrated example, it is preferable to perform a full garbage collection operation in response to evaluating the T/M ratio, as indicated at 230. In a particular embodiment, the determination to initiate the full garbage collection operation based on the T/M ratio is performed by a memory manager (e.g., the memory manager 121 of FIG. 1).

Thus, selectively controlling initiation of a full garbage collection operation based on both a total usage metric and a managed object metric, as illustrated in FIGS. 1-2, may be preferable to controlling initiation of the full garbage collection operation based solely on managed object usage.

Figure 3:
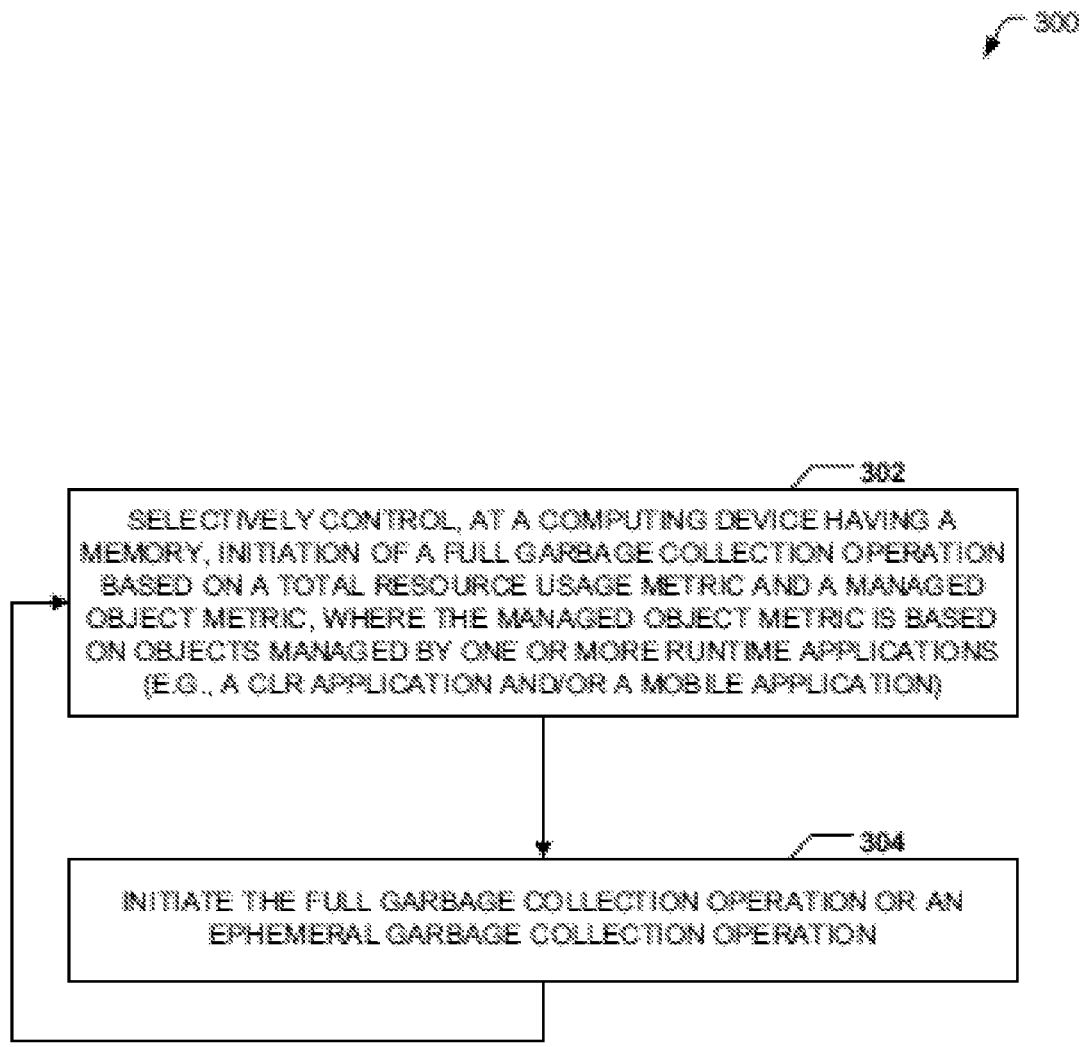
FIG. 3 is a flowchart to illustrate another particular embodiment of a method of performing garbage collection based on a total resource usage metric and a managed object metric.

Referring to FIG. 3, a particular illustrative embodiment of a method 300 of performing garbage collection or of controlling a garbage collection operation is shown. The method 300 includes selectively controlling, at a computing device having a memory, initiation of a full garbage collection operation based on a total resource usage metric and a managed object metric, at 302. The managed object metric is based on objects managed by one or more runtime applications (e.g., a size and/or a number of all managed objects in a heap). An example of a runtime application includes a CLR application and/or a mobile application.

The method 300 further includes initiating either the full garbage collection operation or an ephemeral garbage collection operation, at 304, based on the determination made as a function of the total resource usage metric and the managed object metric. The method 300 may repeat as memory allocations and deallocations take place. In a particular embodiment, the decision to initiate the method 300 is performed (e.g., by a memory manager such as the memory manager 121 of FIG. 1) when a requested allocation of memory exceeds a particular threshold. For example, the method 300 to selectively control garbage collection may be initiated as each megabyte of memory is allocated and after a heap has reached a minimum size (e.g., 20 MB)

Figure 4:
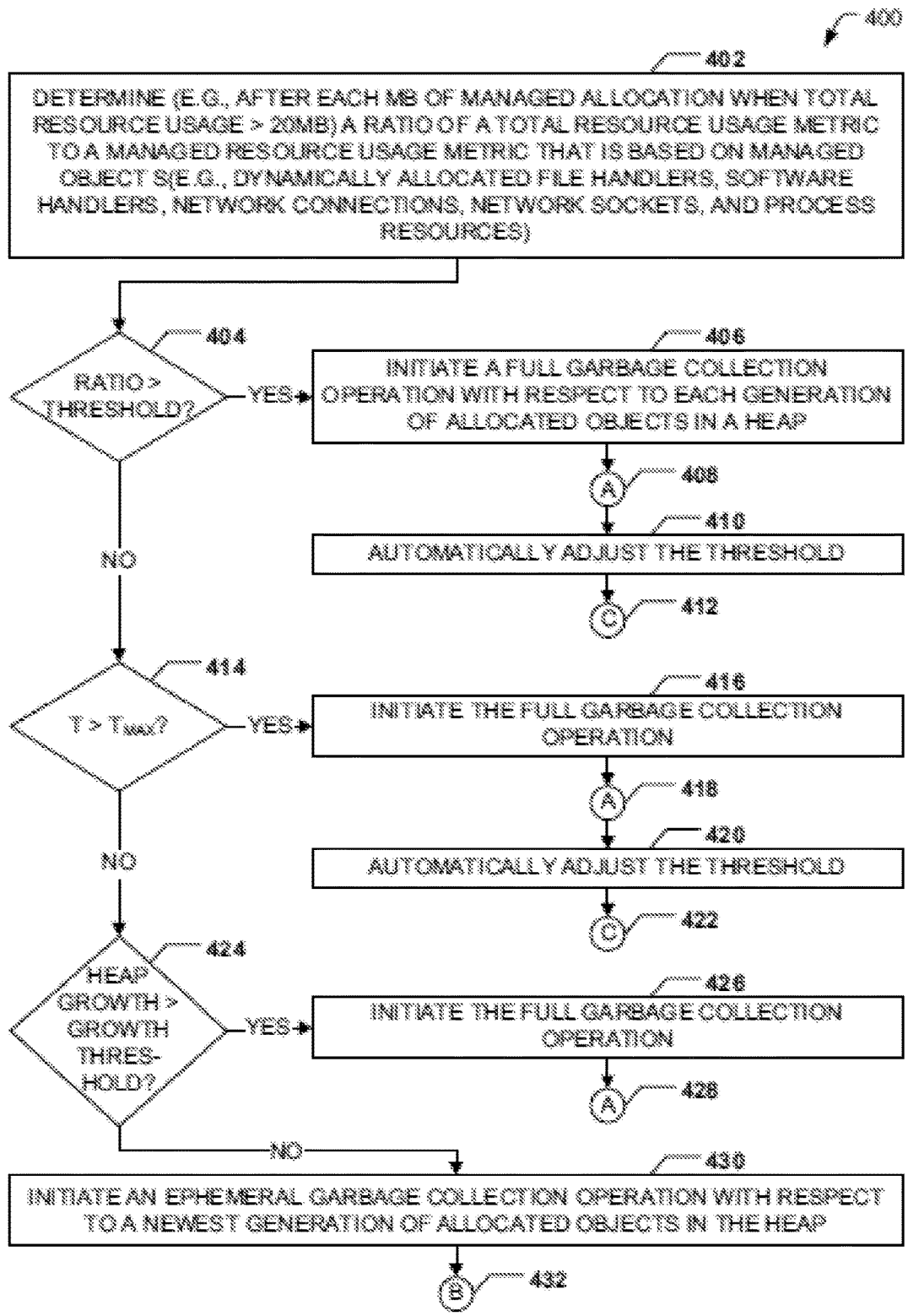
FIG. 4 is a flowchart to illustrate another particular embodiment of a method of performing garbage collection based on a ratio of a total resource usage metric and a managed object metric.

Referring to FIG. 4, a particular detailed embodiment of a method 400 of controlling and performing garbage collection is shown. The method 400 includes determining a ratio of a total resource usage metric to a managed resource usage metric, at 402. For example, the method 400 may be initiated, at 402, after each megabyte of managed allocation of the memory once the total resource usage exceeds a minimum threshold (e.g., 20 megabytes), as shown. Examples of managed objects include dynamically allocated file handlers, software handlers, network connections, network sockets, and process resources.

The method 400 further includes comparing the ratio to a threshold, as shown at 404. For example, the T/M ratio may be compared to a T/M threshold. If the T/M ratio exceeds the T/M threshold, at 404, the method 400 proceeds to initiate a full garbage collection operation with respect to each generation of allocated objects in a heap, at 406. Performing the full garbage collection may include performing operations illustrated with respect to FIG. 5 and referenced as "A" 408 in FIG. 4. The method 400 may automatically adjust the T/M threshold, at 410. Automatically adjusting the T/M threshold may include performing operations illustrated with reference to FIG. 7 and referenced as "C" 412 in FIG. 4.

Referring to step 404, if the T/M ratio does not exceed the T/M threshold, then the method 400 compares the total memory usage T to a maximum total memory usage $T_{MAX}$, at 414. In a particular embodiment, the maximum total memory usage is determined based on an application programming interface (API) call to an operating system. For example, a GetApplicationCap( ) function may provide a maximum heap size, and $T_{MAX}$ may be equal to the maximum heap size minus a buffer value (so that a full garbage collection is triggered before the maximum heap size is reached). In a particular embodiment, the buffer value is the lesser of twice the T/M ratio threshold (in megabytes) and 15 MB.

In a particular embodiment, the method 400 may include performing an additional check (not shown), at 404, to verify that at least a certain number of ephemeral garbage collection operations (e.g., 5) have been performed since a previous T/M ratio-triggered full garbage collection operation. For example, a particular application may have a high T/M ratio because managed objects holding native objects may be remain alive. For such an application, without the additional check, all or a majority of garbage collection operations may turn into T/M ratio-triggered full garbage collection operation. However, when there are no or few ephemeral garbage collection operations, benefits of generational garbage collection may not be realized.

If the total memory usage exceeds the maximum total memory usage at 414, then the full garbage collection operation is initiated, at 416, and performed, at 418. The T/M threshold may also be adjusted, at 420-422. If the total memory usage does not exceed the maximum total memory usage, at 414, then an amount that the heap has grown since a previous garbage collection operation is compared to a growth threshold, at 424. In a particular embodiment, the growth threshold is 5 MB.

If the heap growth has exceeded the growth threshold, at 424, then the method 400 initiates and performs a full garbage collection operation, at 426-428. If the heap growth has not exceeded the growth threshold, at 424, the method 400 initiates an ephemeral garbage collection operation with respect to a newest generation of allocated objects in the heap, at 430. Performing the ephemeral garbage collection may include performing operations illustrated with respect to FIG. 6 and referenced as "B" 432 in FIG. 4.

Figure 5:
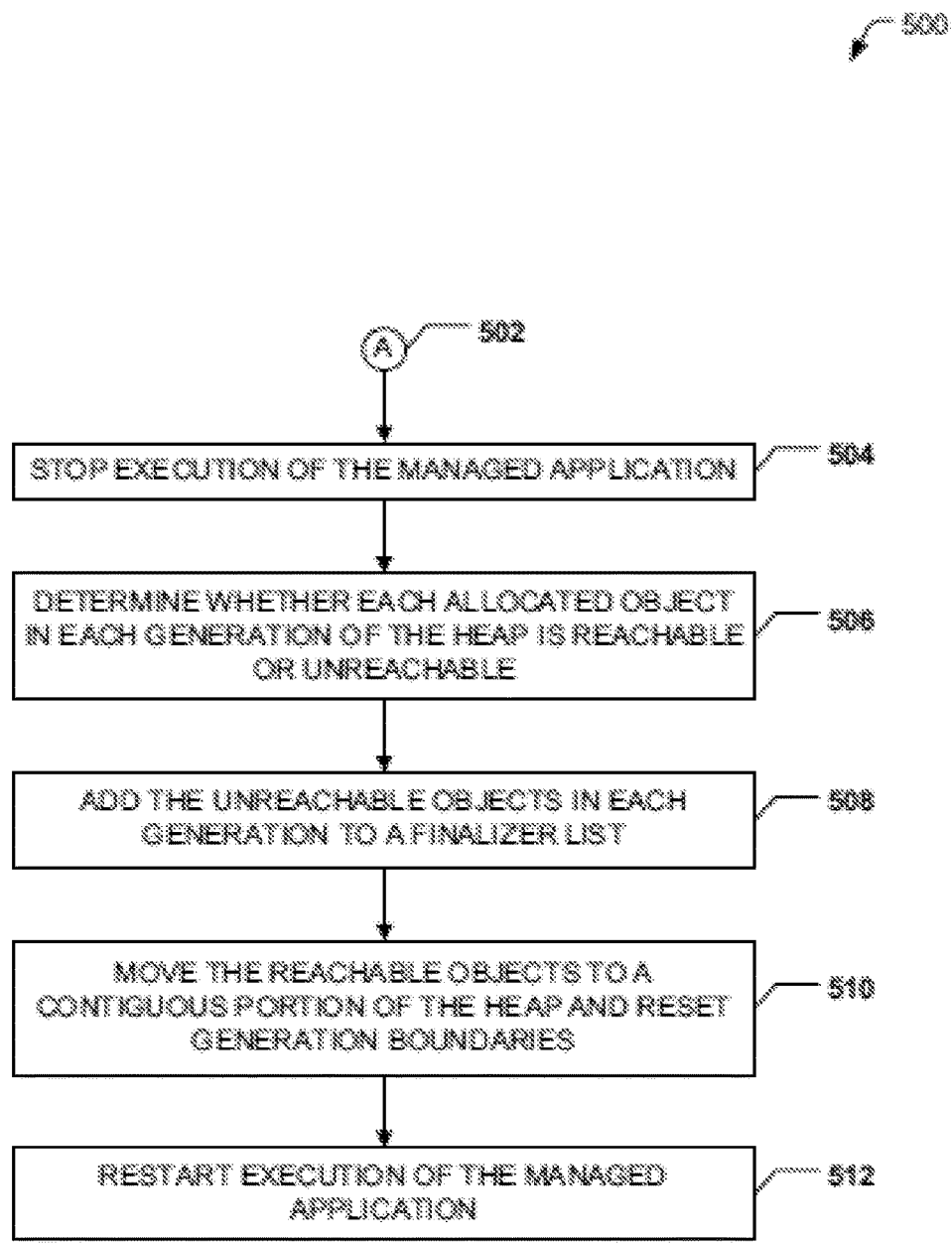
FIG. 5 is a flowchart to illustrate a particular embodiment of a method of performing a full garbage collection operation.

Referring to FIG. 5, a method 500 of performing a full garbage collection operation is shown. The method 500 may begin at "A" 502, corresponding to the label "A" at 408, 418, and 428 of FIG. 4.

The method 500 includes stopping execution of the managed application, at 504. The method 500 also includes determining whether each allocated object in each generation of the heap is reachable (i.e., "alive" if at least one reference to the object exists) or unreachable (i.e., "dead" if no references to the object exist), at 506.

The method further includes adding the unreachable objects in each generation to a finalizer list, at 508, and moving the reachable objects to a contiguous portion of the heap, at 510. In a particular embodiment, consolidating objects into a contiguous portion of the heap reduces heap fragmentation and improves memory latency of the computing device. Consolidating objects may also include modifying existing references to the objects. Such modification of references may be permissible since the managed application was stopped, at 504. The method 500 includes resetting generation boundaries, at 510, and restarting execution of the managed application, at 512. Judicious initiation and performance of full garbage collection, as illustrated in FIG. 5, may improve an amount of available heap space at a computing device.

Figure 6:
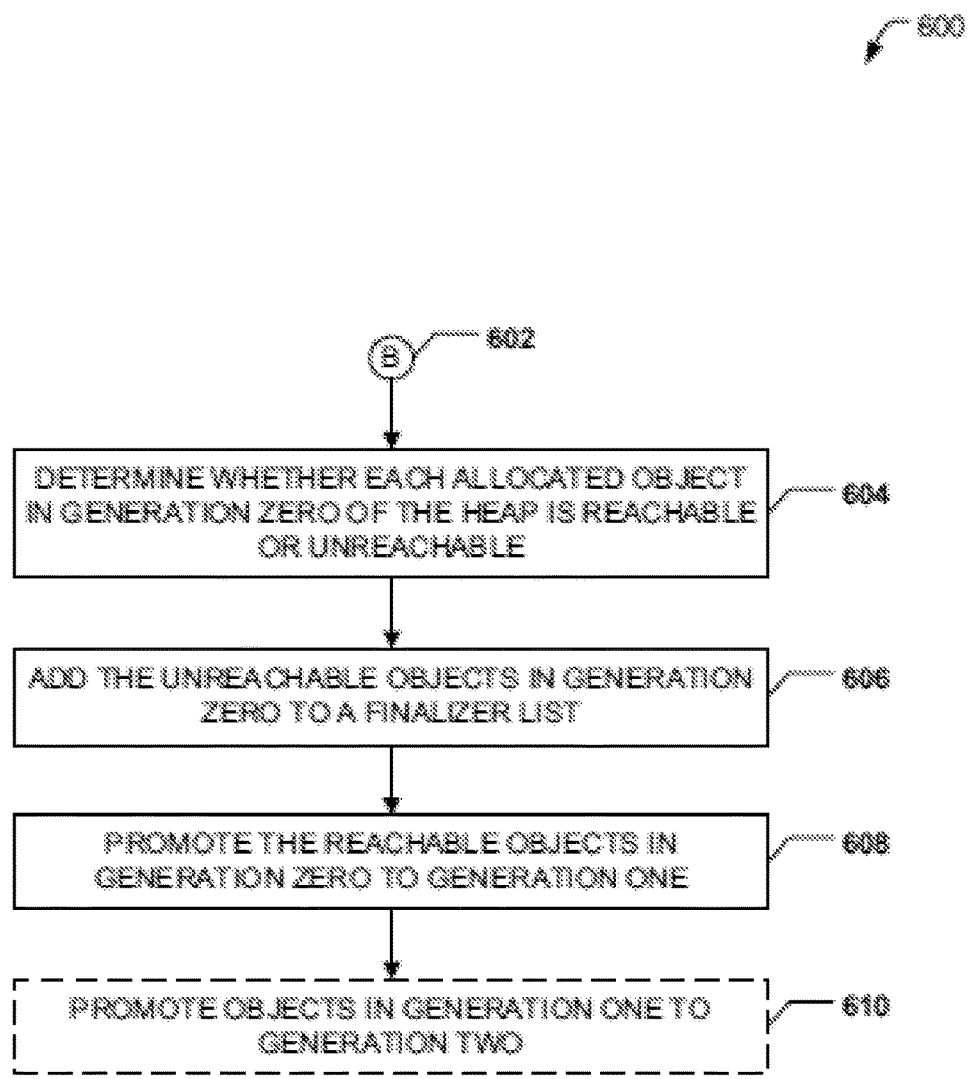
FIG. 6 is a flowchart to illustrate a particular embodiment of a method of performing an ephemeral garbage collection operation.

Referring to FIG. 6, a method 600 of performing an ephemeral garbage collection operation is shown. The method 600 may begin at "B" 602, corresponding to the label "B" 432 of FIG. 4.

The method 600 includes determining whether each allocated object in generation zero (i.e., a newest generation) of the heap is reachable or unreachable, at 604. The method 600 also includes adding the unreachable objects in generation zero to a finalizer list, at 606, and promoting the reachable objects in generation zero to generation one, at 608. If additional generations exist, the method 600 may include promoting objects from generation 1 to generation 2, etc., at 610. It will be appreciated that since the ephemeral garbage collection method 600 may not relocate objects in the heap, the ephemeral garbage collection method 600 may be performed without stopping executing of running applications.

It should be noted that the full garbage collection and ephemeral garbage collection methods 500 and 600 of FIGS. 5 and 6 are for example only. The steps and order of steps performed by the garbage collector may vary depending on an underlying operating system and application framework.

Figure 7:
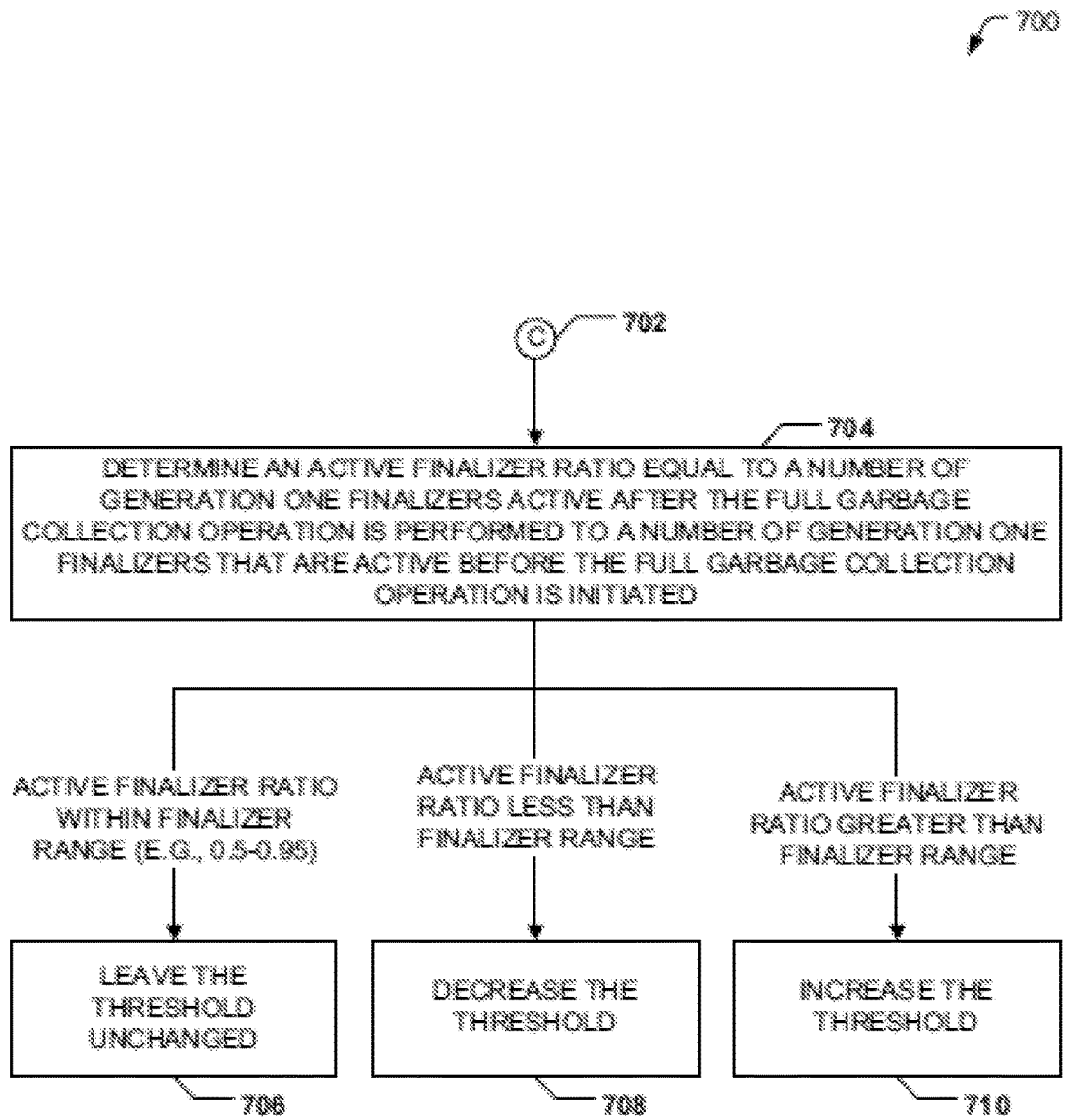
FIG. 7 is a flowchart to illustrate a particular embodiment of a method of tuning the ratio of FIG. 4.

Referring to FIG. 7, a method 700 of automatically adjusting the T/M threshold is shown. The method 700 may begin at "C" 702, corresponding to the label "C" at 412 and 422 of FIG. 4.

The method 700 includes determining an active finalizer ratio, at 704. The active finalizer ratio may be equal to a ratio of how many generation 1 finalizers are active (i.e., how many objects are marked "live" by the garbage collector and listed on a finalizer list) after full garbage collection to how many generation 1 finalizers were active before full garbage collection. To illustrate, if more generation 1 finalizers are active after full garbage collection than before full garbage collection (i.e., the finalizer ratio is increasing), this may mean that the garbage collections triggered by the T/M ratio are occurring too frequently, resulting in wasted processor cycles. Conversely, if the finalizer ratio is decreasing, this may mean that more frequent garbage collections triggered by the T/M ratio may be preferable.

Accordingly, when the active finalizer ratio is within a finalizer range (e.g., 0.5-0.95), the method 700 leaves the T/M threshold unchanged, at 706. When the active finalizer ratio is less than the finalizer range (e.g., less than 0.5), the T/M threshold is decreased, at 708. When the active finalizer ratio is greater than the finalizer range (e.g., greater than 0.95), the T/M threshold is increased, at 710. Thus, the T/M threshold may be dynamically adjusted based on the finalizer ratio to achieve a more efficient timing and frequency of full and ephemeral garbage collection operations.

Thus, a computer-implemented method has been described that includes selectively controlling initiation of a full garbage collection operation based on a total resource usage metric and a managed object metric. The computer implemented method is performed at a computing device. The managed object metric is based on those objects managed by a runtime application. Alternatively, the managed object metric may be based on objects managed by all runtime applications currently being executed by a processor of the computing device.

In a particular example, the runtime application is a common language runtime (CLR) application, a mobile application, or any combination thereof. The total resource usage metric is a measurement of total memory usage of the computing device and the managed object metric is a measurement of the amount of memory allocated to the managed objects. The method may further include determining whether to perform a full garbage collection (e.g., as illustrated in FIG. 5) or an ephemeral garbage collection (e.g., as illustrated in FIG. 6) based on a ratio of the total resource usage metric (T) and the managed object metric (M), where the ratio is T/M. The determination may be made after each megabyte of managed memory allocation. However, the determination may not be made until the total resource usage metric is greater than a minimum total resource usage (e.g., 20 MB).

The T/M threshold for comparison to the T/M ratio may be greater than or equal to 5 and less than or equal to 15. While the T/M ratio is within the range of 5 to 15, the T/M ratio may be set to a default ratio or may be programmed according to user selection and/or system parameters. In addition, the T/M threshold may be adjusted automatically. Automatically adjusting the T/M threshold may include a method based on determining and evaluating an active finalizer ratio, as illustrated with respect to FIG. 7. A finalizer range for use in the finalizer ratio comparison operation may have a lower bound of 0.5 and an upper bound of about 0.95 in a particular illustrative example. A full garbage collection operation may also be initiated when the heap has grown by more than a growth threshold (e.g., 5 MB) since a previous garbage collection operation. When the T/M ratio is less than the T/M threshold, the total memory usage is less than the maximum total memory usage, and the heap has not grown by more than the growth threshold, an ephemeral garbage collection operation may be initiated.

Figure 8:
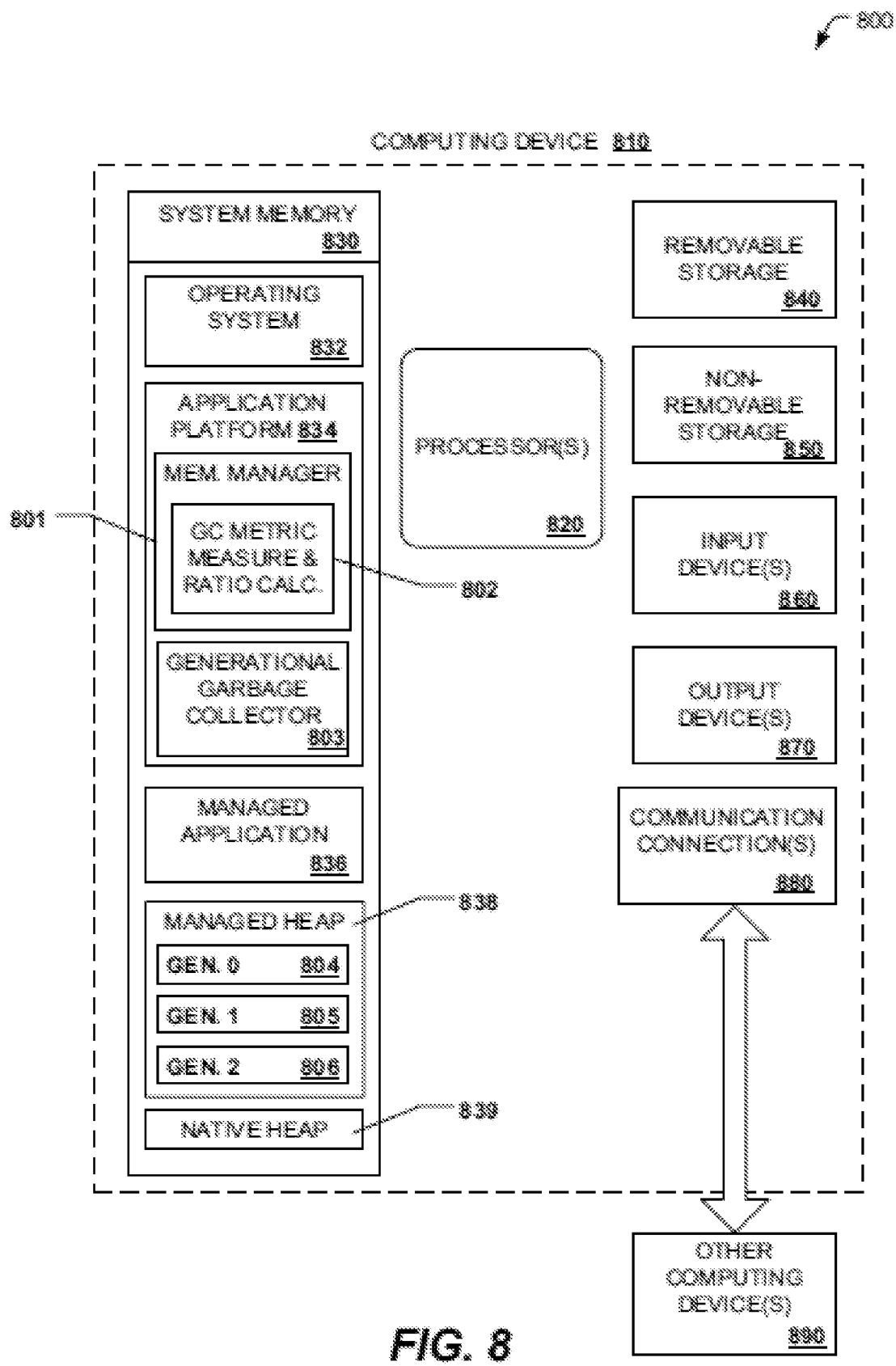
FIG. 8 is a block diagram to illustrate a particular embodiment of a computing environment including a computing device to support systems, methods, and computer program products described in FIGS. 1-7.

Referring to FIG. 8, a particular embodiment of a computing environment 800 including a computing device 810 that is operable to support embodiments of systems, methods, and computer program products according to the present disclosure is shown. The computing device 810 includes at least one processor 820 and a system memory 830. Depending on the configuration and type of computing device, the system memory 830 may be volatile (such as random access memory or "RAM"), non-volatile (such as read-only memory or "ROM," flash memory, and similar memory devices that maintain stored data even when power is not provided), or some combination of the two.

The system memory 830 may include an operating system 832, an application platform 834, a managed application 836, a managed heap 838, and a native heap 839. The managed heap 838 may include multiple generations of dynamically allocated data, such as illustrated generation 0, at 804, generation 1, at 805, and generation 2, at 806. While three generations have been illustrated, it should be understood that the managed heap 838 may include any number of generations, such as two generations or more than three generations, based on the particular application and system configuration.

The application platform 834 includes a memory manager 801 that includes logic 802 to perform garbage collection metric measurement and ratio calculation. The memory manager 801 also includes a generational garbage collector 803. The generational garbage collector 803 may selectively perform full garbage collection or ephemeral garbage collection on the managed heap 838 responsive to needs of the managed application 836 and based on metrics and ratios calculated by the logic 802. In a particular embodiment, the memory manager 801 may perform the methods 300, 400, and 700 of FIGS. 3, 4, and 7, and the generational garbage collector 803 may perform the methods 500 and 600 of FIGS. 5 and 6.

The computing device 810 may also have additional features or functionality. For example, the computing device 810 may include removable and/or non-removable additional data storage devices, such as magnetic disks, optical disks, tape devices, and standard-sized or flash memory cards. Such additional storage is illustrated in FIG. 8 by removable storage 840 and non-removable storage 850. Computer storage media may include volatile and/or non-volatile storage and removable and/or non-removable media implemented in any technology for storage of information such as computer-readable and computer-executable instructions, data structures, program components or other data. The system memory 830, the removable storage 840 and the non-removable storage 850 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 810. Any such computer storage media may be part of the computing device 810.

The computing device 810 may also have input device(s) 860, such as a keyboard, mouse, pen, voice input device, touch input device, motion or gesture input device, etc, connected via one or more wired or wireless input interfaces. Output device(s) 870, such as a display, speakers, printer, etc. may also be connected via one or more wired or wireless output interfaces.

The computing device 810 also contains one or more communication connections that allow the computing device 810 to communicate with other computing devices 890 over a wired or a wireless network. It will be appreciated that not all of the components or devices illustrated in FIG. 8 or otherwise described in the previous paragraphs are necessary to support embodiments as herein described. For example, the removable storage 840 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, a calendar application may display a time scale including highlighted time slots or items corresponding to meetings or other events.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system, comprising:
at least one processor; and
a memory coupled to the at least one processor, the memory storing:
a heap; and
a memory manager executable by the at least one processor to perform one or more operations including at least:
selectively controlling initiation of at least one of a full garbage collection operation or an ephemeral garbage collection operation based on a total resource usage metric and a managed object metric, wherein the managed object metric is based on one or more runtime characteristics of a managed application that performs runtime calls to the one or more managed objects including at least:
determining whether a ratio of the total resource usage metric to the managed object metric is greater than a threshold;
when the ratio is greater than the threshold, initiating the full garbage collection operation including at least:
suspending the managed application that performs runtime calls to one or more managed objects stored in the heap during the full garbage collection operation;
determining whether each of the one or more managed objects in each generation of the heap is a reachable object or an unreachable object;
adding the unreachable objects in each generation to a finalizer list;
consolidating one or more managed objects that remain in the heap into a contiguous portion of the heap during the full garbage collection operation, including moving the reachable objects to a contiguous portion of the heap;
performing the full garbage collection at least partially based on the finalizer list; and
restarting execution of the managed application; and
when the ratio is not greater than the threshold, performing the ephemeral garbage collection operation without suspending the managed application.

2. The system of claim 1, wherein the managed object metric comprises:
a managed object metric based on a ratio of total memory usage over memory usage of the one or more managed objects stored in the heap called by the managed application.

3. The system of claim 1, wherein the managed object metric comprises:
a managed object metric based on a ratio of total memory usage over memory usage of the one or more managed objects stored in the heap called by the managed application, the memory usage including the one or more managed objects and one or more native objects pointed to by the one or more managed objects.

4. The system of claim 3, wherein the heap comprises a managed object heap, the one or more managed objects being stored within the managed object heap, and wherein the one or more native objects are stored within a native object heap.

5. The system of claim 1, wherein the managed object metric is a measurement of memory allocated to the one or more objects managed by the managed application.

6. The system of claim 1, wherein the managed application is not suspended during the ephemeral garbage collection operation.

7. The system of claim 1, wherein the memory manager is further configured to determine whether to selectively control initiation after each megabyte of managed memory allocation, and wherein the determination is not made unless the total resource usage metric is greater than a minimum total resource usage.

8. The system of claim 7, wherein the full garbage collection operation is performed with respect to each generation of objects in the heap and the ephemeral garbage collection operation is performed with respect to a newest generation of one or more objects in the heap.

9. The system of claim 7, wherein the memory manager is further configured to determine whether to selectively control initiation after at least five ephemeral garbage collection operations have been performed since a previous full garbage collection operation.

10. The system of claim 1, wherein the memory manager is further configured to perform one or more operations comprising:
   determining whether a ratio of the total resource usage metric to the managed object metric is greater than a threshold; and
   when the ratio is greater than the threshold, initiating the full garbage collection operation.

11. The system of claim 10, wherein the memory manager is further configured to automatically adjust the threshold, wherein automatically adjusting the threshold comprises:
   determining an active finalizer ratio equal to a number of generation one finalizers that are active after the full garbage collection operation is performed to a number of generation one finalizers that are active before the full garbage collection operation is initiated;
   leaving the threshold unchanged when the active finalizer ratio is within a finalizer range;
   decreasing the threshold when the active finalizer ratio is less than the finalizer range; and
   increasing the threshold when the active finalizer ratio is greater than the finalizer range.

12. The system of claim 10, wherein the memory manager is further configured to perform one or more operations comprising:
   when the ratio is not greater than the threshold, determining whether the total resource usage metric is greater than a maximum total resource usage; and
   when the total resource usage metric is greater than the maximum total resource usage, initiating the full garbage collection operation.

13. The system of claim 12, wherein the memory manager is further configured to perform one or more operations comprising:
   when the total resource usage metric is not greater than the maximum total resource usage, determining an amount that a size of a heap has increased since a previous full garbage collection operation; and
   when the amount is greater than a growth threshold, initiating the full garbage collection operation.

14. The system of claim 13, wherein the memory manager is further configured to, when the amount is less than the growth threshold, initiating the ephemeral garbage collection operation.

15. The system of claim 1, wherein the one or more managed objects include one or more of a file handler object, a software handler object, a network connection object, a network socket object, a process resource object, or any combination thereof.

16. The system of claim 1, wherein the one or more managed objects include a user interface element.

17. A method implemented using one or more processing devices, comprising:
   determining whether to initiate a full garbage collection operation or an ephemeral garbage collection operation on a heap stored within a memory of a device including determining whether a ratio of a total resource usage metric and a managed object metric is greater than a threshold, wherein the managed object metric is based on one or more runtime characteristics of a managed application that performs runtime calls to the one or more managed objects;
   when the ratio is greater than the threshold, initiating the full garbage collection operation including at least:
      suspending the managed application that performs runtime calls to one or more managed objects stored in the heap during the full garbage collection operation;
      determining whether each of the one or more managed objects in each generation of the heap is a reachable object or an unreachable object;
      adding the unreachable objects in each generation to a finalizer list;
      consolidating one or more managed objects that remain in the heap into a contiguous portion of the heap during the full garbage collection operation, including moving the reachable objects to a contiguous portion of the heap;
      performing the full garbage collection at least partially based on the finalizer list; and
      restarting execution of the managed application; and
   when the ratio is not greater than the threshold, performing the ephemeral garbage collection operation without suspending the managed application.

18. The method of claim 17, wherein determining whether to initiate a full garbage collection operation or an ephemeral garbage collection comprises:
   determining whether a total-to-managed (T/M) ratio of the total resource usage metric to the managed object metric is greater than a predetermined threshold.

19. The method of claim 17, wherein performing the full garbage collection at least partially based on the finalizer list comprises:
   performing the full garbage collection operation with respect to each generation of objects in the heap.

20. A system, comprising:
   one or more processing devices; and
   one or more processor-readable storage media bearing one or more instructions that, when executed by the one or more processing devices, perform operations including:
      determining whether a ratio of a total resource usage metric to a managed object metric is greater than a threshold, wherein the managed object metric is based on one or more runtime characteristics of a managed application that performs runtime calls to one or more objects stored within a heap stored within a memory of a device;
      determining whether to initiate a full garbage collection operation or an ephemeral garbage collection operation on the heap stored within the memory of the device based at least partially on the determination whether the ratio of the total resource usage metric to the managed object metric is greater than the threshold;
      when the ratio is greater than the threshold, initiating the full garbage collection operation including at least:
         suspending the managed application that performs runtime calls to one or more managed objects stored in the heap during the full garbage collection operation;
         determining whether each of the one or more managed objects in each generation of the heap is a reachable object or an unreachable object;
         adding the unreachable objects in each generation to a finalizer list;
         consolidating one or more managed objects that remain in the heap into a contiguous portion of the heap during the full garbage collection operation, including moving the reachable objects to a contiguous portion of the heap;
         performing the full garbage collection at least partially based on the finalizer list; and
         restarting execution of the managed application; and when the ratio is not greater than the threshold, then:
  determining whether the total resource usage metric is greater than a maximum total resource usage;
  when the total resource usage metric is greater than the maximum total resource usage, initiating the full garbage collection operation; and
  when the total resource usage metric is not greater than the maximum total resource usage, performing the ephemeral garbage collection operation without suspending the managed application.

* * * * *